United States Patent
Uchida et al.

(10) Patent No.: US 8,343,656 B2
(45) Date of Patent: Jan. 1, 2013

(54) BATTERY ELECTRODE PRODUCTION METHOD

(75) Inventors: Yozo Uchida, Toyota (JP); Nobuyuki Yamazaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/129,423

(22) PCT Filed: Apr. 12, 2010

(86) PCT No.: PCT/JP2010/056535
§ 371 (c)(1),
(2), (4) Date: May 16, 2011

(87) PCT Pub. No.: WO2011/013414
PCT Pub. Date: Feb. 3, 2011

(65) Prior Publication Data
US 2012/0135304 A1    May 31, 2012

(30) Foreign Application Priority Data
Jul. 31, 2009   (JP) .................. 2009-179433

(51) Int. Cl.
*H01M 4/02* (2006.01)
*H01M 4/13* (2010.01)
(52) U.S. Cl. ........................ 429/211; 429/209
(58) Field of Classification Search .................. 429/209, 429/211; 502/101
See application file for complete search history.

(56) References Cited

U.S. PATENT DOCUMENTS

| | | | |
|---|---|---|---|
| 6,045,947 | A | 4/2000 | Shindo et al. |
| 6,667,000 | B1 | 12/2003 | Nakazato et al. |
| 2010/0273052 | A1 | 10/2010 | Sakitani et al. |

FOREIGN PATENT DOCUMENTS

JP    8-329928    12/1996
(Continued)

OTHER PUBLICATIONS

International Search Report in International Application No. PCT/JP2010/056535; Mailing Date: Jul. 6, 2010.
(Continued)

*Primary Examiner* — Helen O Conley
(74) *Attorney, Agent, or Firm* — Finnegan, Henderson, Farabow, Garrett & Dunner, LLP

(57) ABSTRACT

According to the present invention, formation of a compound material layer is carried out by a method that includes a step of forming a binder solution layer 56 by applying a binder solution 50 containing a binder 54 to a current collector 10, a step of depositing the binder solution layer 56 and a compound material paste layer 46 on the current collector 10 by applying a compound material paste 40 over the binder solution layer 56, and a step of obtaining an electrode in which the compound material layer is formed on the current collector 10 by drying both the binder solution layer 56 and the compound material paste layer 46. Here, the binder solution 56 has a binder solution non-coated region 58 where a surface 12 of the current collector 10 is exposed, and the drying is carried out in a state in which a portion of the compound material paste layer 46 is deposited on the current collector 10 in the binder solution non-coated region 58.

9 Claims, 10 Drawing Sheets

FOREIGN PATENT DOCUMENTS

| | | |
|---|---|---|
| JP | 9-35707 | 2/1997 |
| JP | 9-134718 | 5/1997 |
| JP | 9-185960 | 7/1997 |
| JP | 11-176423 | 7/1999 |
| JP | 11-283615 | 10/1999 |
| JP | 2000-48805 | 2/2000 |
| JP | 2003-157847 | 5/2003 |
| JP | 3553244 | 5/2004 |
| JP | 2009-230976 | 10/2009 |
| JP | 2009-238488 | 10/2009 |
| JP | 2009-238720 | 10/2009 |
| JP | 2009-295474 | 12/2009 |

OTHER PUBLICATIONS

Translation of the International Preliminary Report on Patentability for PCT/JP2010/056535 dated Feb. 16, 2012.

BATTERY ELECTRODE PRODUCTION METHOD

CROSS-REFERENCE TO RELATED APPLICATIONS

This application is a national phase application of International Application No. PCT/JP2010/056535, filed Apr. 12, 2010, and claims the priority of Japanese Application No. 2009-179433, filed Jul. 31, 2009, the contents of both of which are incorporated herein by reference.

TECHNICAL FIELD

The present invention relates to a method for producing a battery electrode, and more particularly, to a method for producing a battery electrode having a configuration in which an electrode compound material layer containing an electrode active material is retained on a current collector.

BACKGROUND ART

Lithium ion batteries, nickel hydrogen batteries and other secondary batteries have recently become increasing important for use as vehicle-mounted power supplies or power supplies of personal computers and portable terminals. In particular, lithium secondary batteries, which are lightweight and provide high energy density, are expected to be preferably used as vehicle-mounted, high-output power supplies. In a typical configuration of this type of secondary battery, an electrode is provided that has a configuration in which a material capable of reversibly occluding and releasing lithium ions (electrode active material) is retained on an electrically conductive member (electrode current collector). Typical examples of electrode active materials used in negative electrodes (negative electrode active materials) include carbon-based materials such as graphite carbon or amorphous carbon. In addition, typical examples of electrode current collectors used in negative electrodes (negative electrode current collectors) include sheet-like and foil-like members consisting mainly of copper or copper alloy.

In the production of a negative electrode having such a configuration, a typical example of a method for retaining the negative electrode active material on the negative electrode current collector consists of coating a compound material paste, in which a negative electrode active material powder and a binder are dispersed in a suitable medium, onto the negative electrode current collector (such as copper foil) followed by drying by passing through a hot air dryer and the like to form a layer containing the negative electrode active material (negative electrode compound material layer). In this case, the binder in the negative electrode compound material layer fulfills the role of binding the negative electrode active materials as well as binding between the negative electrode compound material layer and the negative electrode current collector. In addition, the binder in the negative electrode compound material layer also fulfills the role of binding the negative electrode compound material layer to the negative electrode current collector. Patent Documents 1 to 3 disclose examples of technical documents relating to this type of electrode production method.

Patent Document 1: Japanese Patent Application Laid-open No. H11-283615
Patent Document 2: Japanese Patent Application Laid-open No. 2003-157847
Patent Document 3: Japanese Patent No. 3553244

DISCLOSURE OF THE INVENTION

However, in the production of a negative electrode as described above, when a compound material paste containing a negative electrode active material powder and a binder is coated onto a negative electrode current collector and dried, convection occurs during drying, and since binder in the vicinity of the current collector gathers (rises up) in the surface layer portion of the object coated with paste (opposite side of the current collector), the amount of the binder in the vicinity of the current collector decreases, thereby resulting in the problem of a decrease in adhesive strength (adhesion) between the negative electrode current collector and the negative electrode compound material layer. If the adhesive strength between the negative electrode current collector and the negative electrode compound material layer decreases, since the negative electrode compound material layer lifts off or peels from the negative electrode current collector in subsequent production steps (such as a step of winding a negative electrode sheet and positive electrode sheet in the form of a spiral) or during use of the battery, this can cause a decrease in battery performance. With the foregoing in view, the primary object of the present invention is to provide a battery electrode production method that is able to enhance adhesive strength (adhesion) between a current collector and a compound material layer.

According to the present invention, a method for producing a battery electrode having a configuration in which a compound material layer containing an active material and a binder is retained on a current collector. The compound material layer is formed by applying a compound material paste containing the active material to the current collector followed by drying.

Formation of the compound material layer includes forming a binder solution layer by applying a binder solution containing a binder to the current collector. In addition, it also includes depositing the binder solution layer and a compound material paste layer on the current collector by applying the compound material paste over the binder solution layer. Moreover, it also includes obtaining an electrode in which the compound material layer is formed on the current collector by drying both the deposited binder solution layer and compound material paste layer. Here, the binder solution layer has a region where the binder solution is not coated and the surface of the current collector is exposed, and the drying is carried out in a state in which a portion of the compound material paste layer is deposited on the current collector in the region where the binder solution is not coated.

According to the method of the present invention, since the compound material paste layer is formed by forming the binder solution layer between the current collector and the compound material paste layer and then drying the binder solution layer and the compound material paste layer, a large amount of binder derived from the binder solution layer is arranged at the interface between the current collector and the compound material layer. As a result, the amount of binder in the vicinity of the current collector increases and an electrode is obtained that is provided with a compound material layer having favorable adhesion (adhesive strength) with the current collector.

In addition, since the binder solution layer has a region where the binder solution is not coated and the surface of the current collector is exposed, and drying is carried out in a state in which a portion of the compound material paste layer is deposited on the current collector in the region where the binder solution is not coated, a region exists where binder derived from the binder solution layer is not arranged at the interface between the compound material layer and the current collector obtained after drying. An electrically conductive path is secured between the current collector and the compound material layer through the region where the binder is not arranged. Thus, according to the present invention, an electrode can be produced that is provided with a compound material layer that has favorable adhesion (adhesive strength) with the current collector and has favorable electrical conductivity (small interface resistance between the compound material layer and the current collector). The use of such an electrode enables the construction of a battery that satisfies at least one (and preferably all) of high cycle durability, superior output characteristics and favorable productivity.

In a preferable aspect of the production method disclosed herein, the binder solution layer is formed in the form of a plurality of mutually independent dots (punctate pattern). Formation of the binder solution layer in the form of dots enables the region where the binder solution is not coated to be formed easily. This dot-like binder solution layer can be easily formed by, for example, spraying the binder solution.

In a preferable aspect of the production method disclosed herein, the binder solution layer is formed in the form of a plurality of mutually connected dots. In this case, a binder network is formed by connecting the dots. Consequently, in comparison with separate dots, adhesion (adhesive strength) between the current collector and the compound material layer can be effectively enhanced. This binder solution layer in the form of connected dots can be formed by, for example, carrying out hydrophilic treatment on the surface of the current collector followed by carrying out spraying as described above.

In a preferable aspect of the production method disclosed herein, a coverage rate of the binder solution layer in a region, on the surface of the current collector, where the compound material layer is formed is 40 to 80%. If the coverage rate of the binder solution layer is excessively high (typically, if it exceeds 80%), the amount of binder in the vicinity of the current collector increases excessively, which may cause an increase in the interface resistance between the current collector and the compound material layer, while on the other hand, if the coverage rate of the binder solution layer is excessively low (typically, if it is less than 40%), the amount of binder in the vicinity of the current collector decreases excessively, which may cause poor adhesion between the current collector and the compound material layer. Thus, the coverage rate (coated surface area) of the binder solution layer within the entire region where the compound material layer is formed is suitably within the range of roughly 40 to 80%, normally preferably within the range of 50 to 80%, and more preferably within the range of, for example, 60 to 80%.

In an aspect of the production method disclosed herein, the compound material paste layer can be dried rapidly since segregation of binder caused by migration is not required to be taken into consideration when setting the drying rate of the compound material paste layer. For example, a solvent present in the compound material paste layer can be volatilized at a rate of 0.15 mg/s or more (namely, 0.15 mg/s·cm$^2$ or more) per 1 cm$^2$ of liquid surface area. Consequently, electrode productivity is drastically improved.

In an aspect disclosed herein, the solvent of the compound material paste may contain water. In this case, carbon tetrachloride ($CCl_4$) or a fluorine-based liquid is preferably used for the solvent of the binder solution. Since carbon tetrachloride and fluorine-based liquids easily separate into two phases with water and have a large difference in specific gravity with water, they are preferably used as a binder solution suitable for the object of the present invention. In addition, in a preferable aspect disclosed herein, the solvent of the compound material paste contains N-methylpyrrolidone (NMP). In this case, carbon tetrachloride ($CCl_4$) or a fluorine-based liquid is preferably used for the solvent of the binder solution. Since carbon tetrachloride and fluorine-based liquids easily separate into two phases with N-methylpyrrolidone and have a large difference in specific gravity therewith, they are preferably used as a binder solvent suitable for the object of the present invention.

In an aspect disclosed herein, the binder solution layer is formed by spraying the binder solution. Although interface resistance between the current collector and compound material layer may increase and battery performance may decrease if the amount of the binder on the surface of the current collector is excessively large, since use of this method enables an atomized (granular) binder solution layer to be formed on the surface of the current collector, interface resistance between the compound material layer and the current collector can be reduced in comparison with the case of forming the binder solution layer over the entire surface of the current collector.

According to the present invention, a battery (for example, a lithium secondary battery) is also provided by using an electrode obtained according to any of the methods disclosed herein. In a preferable aspect disclosed herein, the electrode has a configuration in which a compound material layer containing an active material is retained on a current collector. When the compound material layer is divided into two equal parts at a central portion thereof in a direction of thickness, an amount of the binder contained in a divided portion arranged on a current collector side of the compound material layer is larger than an amount of the binder contained in a divided portion arranged on an opposite side from the current collector. Since this battery is composed by using the above-mentioned electrode for at least one of the electrodes, it demonstrates superior battery performance. For example, as a result of constructing a battery using the above-mentioned electrode, a battery can be provided that satisfies at least one (and preferably all) of high cycle durability, superior output characteristics and favorable productivity.

This type of battery is preferable for use as a battery installed in a vehicle such as an automobile. Thus, according to the present invention, a vehicle is provided that is equipped with any of the batteries disclosed herein (which may be in the form of a battery assembly in which a plurality of batteries are interconnected). In particular, the battery is preferably a lithium secondary battery (and typically, a lithium ion battery) since it is lightweight and allows the obtaining of a high output, and the vehicle (and typically, an automobile) is preferably provided with the lithium secondary battery as a motive power supply (and typically, a motive power supply of a hybrid vehicle or electric vehicle).

BEST MODE FOR CARRYING OUT THE INVENTION

Figure 1:
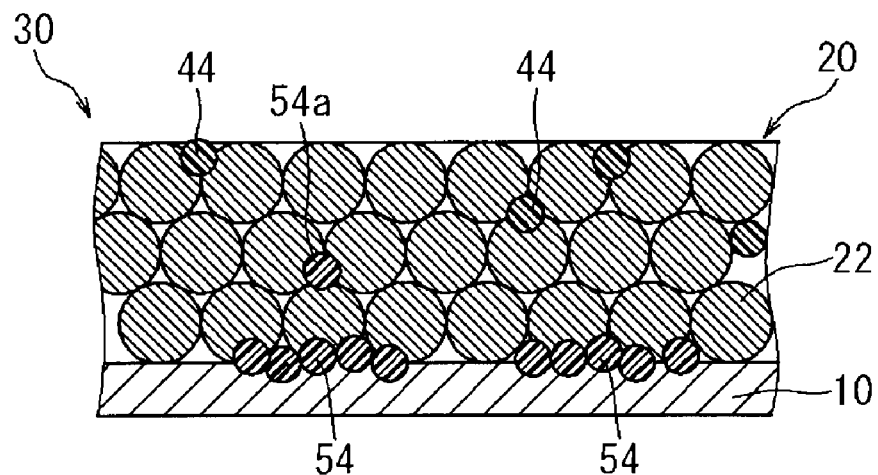
FIG. 1 is a cross-sectional view schematically showing a negative electrode relating to an embodiment of the present invention.

The following provides an explanation of embodiments according to the present invention while referring to the drawings. In the following drawings, those members and sites demonstrating the same actions are explained using the same reference symbols. Furthermore, the dimensional relationships in each drawing (such as length, width and thickness) do not reflect actual dimensional relationships. In addition, matters other than those specifically mentioned in the present description that are required for carrying out the present invention (such as the configuration and production method of an electrode body provided with a positive electrode and negative electrode, the configuration and production method of a separator and electrolyte, batteries, or other general technical matters relating to battery construction) can be understood to be design matters for a person with ordinary skill in the art based on the prior art in the relevant field.

As shown in FIG. 1, the electrode production method disclosed herein is a production method of an electrode 30 having a configuration in which a compound material layer 20, containing an active material 22 and a first binder 54, is retained on a current collector 10. This compound material layer 20 is formed by applying a compound material paste 40 containing the active material 22 to the current collector 10 followed by drying (see FIG. 4).

Figure 3:
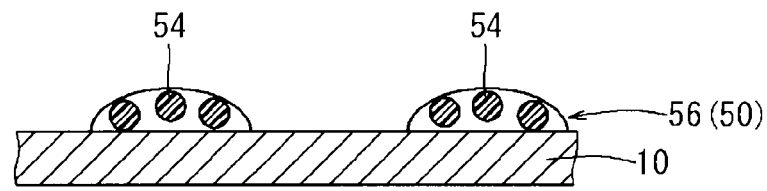
FIG. 3 is a cross-sectional view schematically showing the production process of a negative electrode relating to an embodiment of the present invention.
Figure 4:
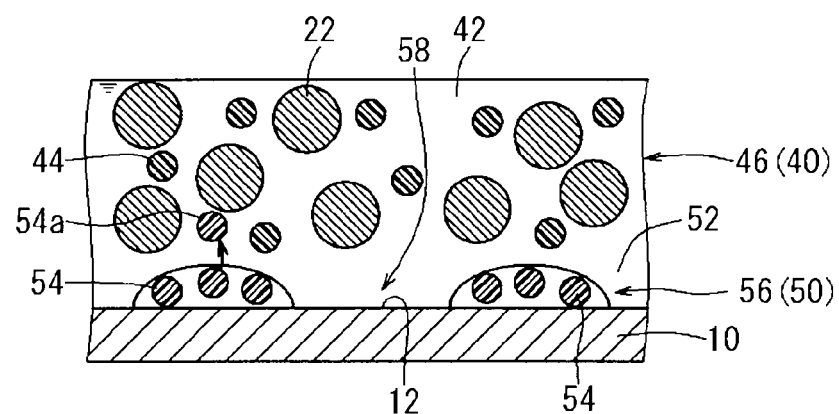
FIG. 4 is a cross-sectional view schematically showing the production process of a negative electrode relating to an embodiment of the present invention.
Figure 5:
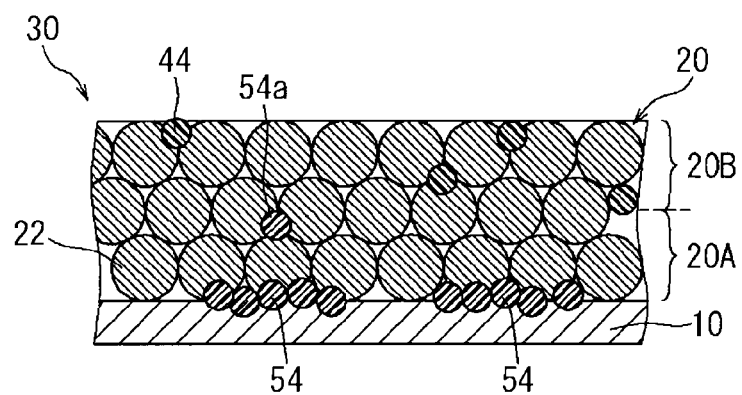
FIG. 5 is a cross-sectional view schematically showing the production process of a negative electrode relating to an embodiment of the present invention.

In the electrode production method of the present embodiment, as shown in FIG. 3, a binder solution layer 56 is first formed by applying a binder solution 50 containing the first binder 54 to the current collector 10. Next, as shown in FIG. 4, the binder solution layer 56 and a compound material paste layer 46 are deposited on the current collector 10 by applying the compound material paste 40 over the binder solution layer 56. As shown in FIG. 5, the electrode 30 is obtained in which the compound material layer 20 is formed on the current collector 10 by drying both the deposited binder solution layer 56 and compound material paste layer 46. Here, the binder solution layer has a binder solution non-coated region 58 where a surface 12 of the current collector 10 is exposed as shown in FIG. 3. The drying is carried out in a state in which a portion of the compound material paste layer 46 is deposited on the current collector 10 within the binder solution non-coated region 58 as shown in FIG. 4.

According to the production method of the present embodiment, since the binder solution layer 56 is formed between the current collector 10 and the compound material paste layer 46, and the compound material layer 20 is formed by drying both the binder solution layer 56 and the compound material paste layer 46, a large amount of the binder 54 derived from the binder solution layer 56 is arranged at the interface between the current collector 10 and the compound material layer 20. As a result, there is a large amount of binder in the vicinity of the current collector 10, and the electrode 30 is obtained that is provided with a compound material layer having favorable adhesion (adhesive strength) with the current collector 10.

In addition, since the binder solution layer 56 has the binder solution non-coated region (pattern of openings extending to the surface of the current collector) 58 where the surface 12 of the current collector 10 is exposed, and drying is carried out in a state in which a portion of the compound material layer 46 is deposited on the current collector 10 within the binder solution non-coated region (opening pattern) 58, a region exists where the binder 54 derived from the binder solution layer 56 is not arranged at the interface between the compound material layer 20 and the current collector 10 obtained after drying. An electrically conductive path is secured between the current collector 10 and the compound material layer 20 through the region where the binder 54 is not arranged. Thus, according to the configuration of present embodiment, the electrode 30 can be produced that is provided with the compound material layer 20 that has favorable adhesion (adhesive strength) with the current collector 10 and has favorable electrical conductivity (small interface resistance between the compound material layer 20 and the current collector 10). The use of this electrode 30 enables the construction of a battery that satisfies at least one (and preferably all) of high cycle durability, superior output characteristics and favorable productivity.

Figure 6A:
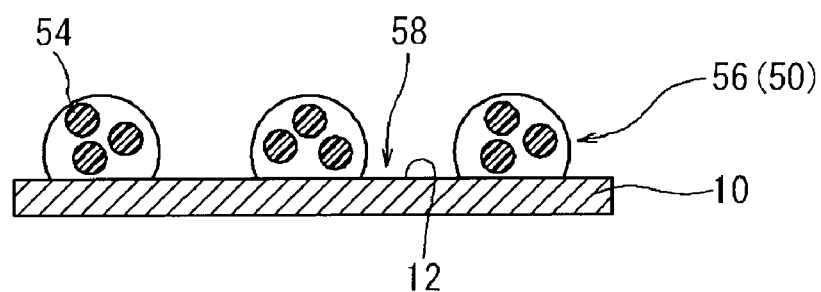
FIG. 6A is a cross-sectional view schematically showing the production process of a negative electrode relating to an embodiment of the present invention.
Figure 6B:
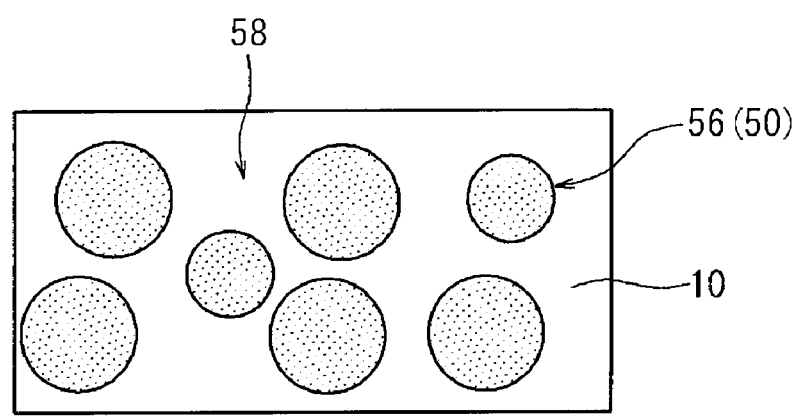
FIG. 6B is an overhead view schematically showing the production process of a negative electrode relating to an embodiment of the present invention.

In the technology disclosed herein, as shown in FIGS. 6A and 6B, the binder solution layer 56 is formed in the form of mutually independent dots (in the form of separate dots). Formation of the binder solution layer 56 in the form of dots enables the binder solution non-coated region 58 to be formed easily. This dot-like binder solution layer 56 can be easily formed by, for example, spraying the binder solution 50 onto the surface of the current collector.

Figure 7A:
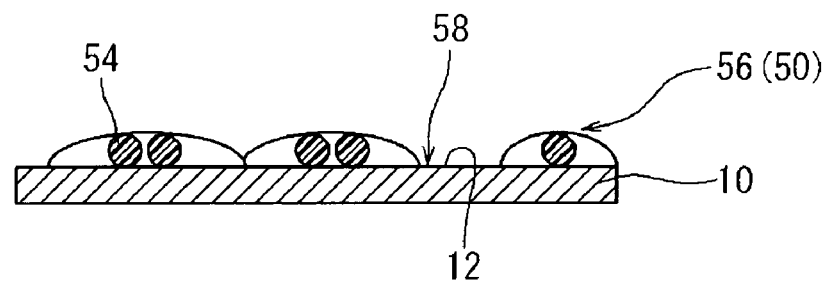
FIG. 7A is a cross-sectional view schematically showing the production process of a negative electrode relating to an embodiment of the present invention.
Figure 7B:
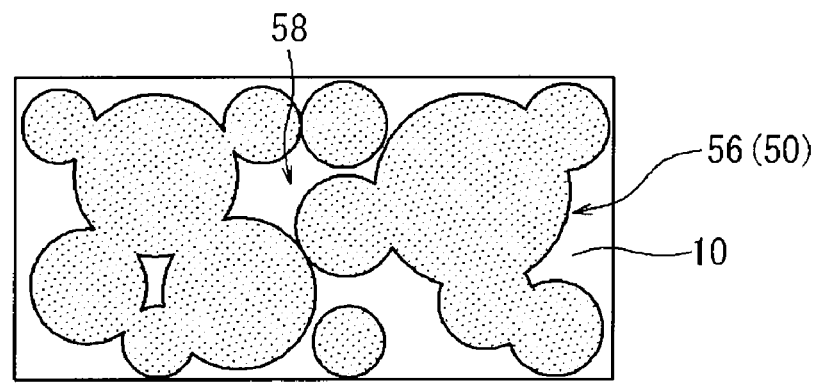
FIG. 7B is an overhead view schematically showing the production process of a negative electrode relating to an embodiment of the present invention.

In addition, in a preferable technology disclosed herein, as shown in FIGS. 7A and 7B, the binder solution layer 56 is formed in the form of mutually connected dots (in the form of an irregular surface pattern in which dots are connected). In this case, a binder network is formed by connecting the dots. Consequently, in comparison with separate dots, adhesion (adhesive strength) between the current collector and the compound material layer can be effectively enhanced.

This binder solution layer 56 in the form of connected dots can be formed by, for example, carrying out hydrophilic treatment on the surface 12 of the current collector followed by carrying out spraying as described above. There are no particular limitations on the method used to carry out the hydrophilic treatment, and a conventionally known method can be suitably employed. For example, the hydrophilic treatment may consist of surface modification by plasma radiation or surface modification by ultraviolet (UV) radiation. Since wettability of the current collector surface to the binder solution is improved by the hydrophilic treatment, the liquid droplets (dots) are connected. As a result, a binder solution layer in the form of mutually connected dots can be formed. The contact angle (wettability) of the binder solution is suitably roughly 60° or less, and preferably, for example, within the range of 5 to 30°.

In addition, in a preferable technology disclosed herein, the coverage rate of the binder solution layer in the region (range), on the surface of the current collector, where the compound material layer is formed is 40 to 80%. In other words, roughly 40 to 80% of the region (range) of the surface of the current collector where the compound material paste is applied is preferably covered by the binder solution layer 56. If the coverage rate of the binder solution layer is excessively high (typically, if it exceeds 80%), the amount of binder in the vicinity of the current collector increases excessively, which may cause an increase in the interface resistance between the current collector and the compound material layer, while on the other hand, if the coverage rate of the binder solution layer is excessively low (typically, if it is less than 40%), the amount of binder in the vicinity of the current collector decreases excessively, which may cause poor adhesion between the current collector and the compound material layer. Thus, the coverage rate of the binder solution layer within the entire region where the compound material layer is formed is suitably within the range of roughly 40 to 80%, normally preferably within the range of 50 to 80%, and more preferably within the range of, for example, 60 to 80%.

Furthermore, the coated form of the binder solution layer 56 is not limited to the form of dots as described above. The binder solution layer 56 is only required to be of a form that has the binder solution non-coated region (opening pattern) 58 and a coated region in the region that superimposes the compound material paste layer 46, and can be modified to have various pattern forms. For example, the binder solution layer 56 can be formed into the form of stripes, in which uncoated regions and coated regions are alternately repeated, in the region that superimposes the compound material paste layer 46. In addition, the method used to coat the binder solution is not limited to spraying as described above, but rather a printing method such as inkjet printing, relief printing or gravure printing can also be employed.

In a preferable technology disclosed herein, the binder solution 50 is composed such that it is able to maintain a state in which it is separated from the compound material paste 40 over at least a fixed period of time. More specifically, as shown in FIG. 4, a state (liquid phase bilayer state) in which a liquid phase in the form of two layers consisting of the binder solution layer 56 and the compound material paste layer 46 is deposited can be formed at least from the time the compound material paste 40 is applied to the binder solution layer 56 until the time it is dried (for roughly 0.1 seconds or more, and for example, 1 to about 90 seconds or more, and normally for about 2 to 10 seconds or more). The configuration of the drying oven, drying conditions (temperature, time, air flow rate and the like), electrode body transport speed and the like are adjusted so that the compound material paste layer 46 becomes at least generally dry (for example, to an extent to which 50% by volume of the solvent has been volatilized and removed) during the time during which this separation is possible, namely during the time the two phases of the binder solution layer 56 and the compound material paste layer 46 are in a separated state (and typically, separated into two layers).

As a result, since mixing of the binder solution layer 56 and the compound material paste layer 46 is inhibited at least during the time from application of the compound material paste 40 to the binder solution layer 56 to the time it is dried, the first binder 54 can be suitably confined to the vicinity of the current collector 10.

Formation of the above-mentioned liquid phase bilayer state (inhibition of mixing) can be realized by, for example, making at least one of the binder solution and the compound material paste to have a high viscosity. For example, the viscosity of at least one of the binder solution and the compound material paste is adjusted to 1000 mPa·s or more (B type viscometer rotor, 20 rpm, 20° C.). As a result, mixing of the binder solution layer and compound material paste layer can be suitably inhibited. The higher viscosity as described above is suitably about 1000 mPa·s or more, is normally preferably 2000 mPa·s or more, and for example, is more preferably 3000 mPa·s or more. Although there are no particular limitations on the upper limit of the higher viscosity, it is roughly about 20000 mPa·s, and normally preferably 10000 mPa·s or less (for example, 8000 mPa·s or less).

In addition, the viscosity (higher viscosity) of one of the binder solution and compound material paste is adjusted to 2000 mPa·s or more (and preferably 3000 mPa·s or more), while the viscosity of the other (lower viscosity) is adjusted to 1000 mPa·s or less (and preferably 500 mPa·s or less (for example about 80 to 500 mPa·s, or for example, about 300 to 500 mPa·s). As a result of providing such a difference in viscosity, the above-mentioned mixing can be more suitably inhibited. From the viewpoint of inhibiting mixing, the difference in viscosity between the binder solution and the compound material paste is suitably roughly 1000 mPa·s or more, normally preferably 2000 mPa·s or more, and for example, more preferably 2500 mPa·s or more (for example, within the range of 2500 to 8000 mPa·s). In a preferable aspect disclosed herein, the compound material paste has the higher viscosity while the binder solution has the lower viscosity.

The viscosities of the binder solution and the compound material paste can be adjusted by, for example, suitably adjusting the solid content in the liquid. For example, the viscosity of the compound material paste can be adjusted by suitably adjusting the solid concentrations of active material, binder and other components forming the compound material layer (such as electrically conductive materials) in the compound material paste. In addition, the viscosity of the binder solution can be adjusted by suitably adjusting the binder concentration in the binder solution. Alternatively, the above viscosities may also be adjusted to be within the preferable ranges by adding a thickener (and typically, a polymer material).

An example of another method for realizing the above-mentioned liquid phase bilayer state (inhibition of mixing) is a method that imparts a difference in SP values. Preferably, the difference in SP values between the binder solution and the compound material paste is adjusted to be 2.0 or more. The above-mentioned mixing can be suitably inhibited by imparting a difference in SP values in this manner. Generally, the difference in SP values is suitably 2 or more, normally preferably 2 to 25, and more preferably, for example, 5 to 20.

A difference in SP values within the above-mentioned ranges can be realized by suitably selecting the solvent of the compound material paste and the solvent of the binder solution. For example, in the case the solvent of the compound material paste is water (SP value: 23.4) or N-methylpyrrolidone (SP value: 11.3), then carbon tetrachloride (SP value: 8.6) or a fluorine-based liquid can be preferably used for the solvent of the binder solution. Alternatively, even in the case of using the same solvent for the solvent of the compound material paste and the solvent of the binder solution, a difference in SP values that is within the above-mentioned ranges can be realized by suitably selecting other material components that compose the compound paste and the binder solution (active material, binder and other components that form the compound material layer).

An example of another method for realizing the above-mentioned liquid phase bilayer state (inhibition of mixing) is a method that imparts a difference in specific gravity. Preferably, the specific gravities are adjusted such that the specific gravity of the binder solution is higher than the specific gravity of the compound material paste. As a result of imparting a difference in specific gravities in this manner, the above-mentioned mixing can be suitably inhibited. Methods for realizing the liquid phase bilayer state as described above can each be used alone or can be used in combination.

Furthermore, as shown in FIG. 4, when forming the liquid phase bilayer state as previously described, a portion 54a of the first binder in the binder solution layer 56 is diffused in the compound material paste 46. As a result of diffusing the portion 54a of the first binder in the compound material paste layer 46 in this manner, the amount of the binder in the vicinity of the current collector is adjusted to a suitable amount, and an electrically conductive path is secured between the current collector 10 and the compound material layer 20. In addition, active material 22 present in the compound material layer can be adhered together by the first binder 54a diffused into the compound material paste layer 46.

In addition, in the technology disclosed herein, the compound material paste 40 (compound material paste layer 46) contains the second binder 44. This second binder 44 may be of the same material (and typically, a polymer material) or a different material from the first binder 54. In this case, active material present in the compound material layer is more strongly bound together by the second binder contained in the compound material paste layer.

In a preferable aspect disclosed herein, the content of the first binder per unit surface area of the binder solution layer is 60% by weight or more (for example, 70 to 99% by weight, and preferably 80 to 98% by weight (for example, about 95% by weight)) based on the combined total of the content of the first binder per unit surface area of the binder solution layer and the content of the second binder per unit surface area of the compound material paste layer. By dividing the contents of the first binder and the second binder in this manner, the distribution of binder in the compound material layer obtained after drying can be suitably controlled, and problems attributable to segregation of binder can be resolved.

As shown in FIG. 5, although there are no particular limitations thereon, the degree of uneven distribution of binder when the compound material layer 20 is divided into two parts in the center in the vertical direction (direction of thickness) (amount of bonder in an upper layer side 20B/amount of binder in a lower layer side 20A) is generally within the range of 0.3 to 1.0, and for example, about 0.5 to 1.0. If the degree of uneven distribution of binder exceeds 1.0 (namely, a state in which the amount of the binder of the upper layer side 20B is greater than the amount of the binder of the lower layer side 20A), adhesion between the compound material layer 20 and the current collector 10 may decrease due to a shortage of binder of the compound material layer 20 in the vicinity of the current collector 10. On the other hand, if the degree of uneven distribution of binder is less than 0.3 (namely, a state in which the amount of the binder of the lower layer side 20A is far greater than the amount of the binder of the upper layer side 20B), there is increased susceptibility to the occurrence of slippage and the like of the active material 22 in the surface portion of the compound material layer due to a shortage of binder in the vicinity of the surface portion of the compound material layer 20. Thus, generally the degree of uneven distribution of binder is suitably within the range of roughly 0.3 to 1.0, preferably, for example, 0.5 to 1.0, and normally more preferably 0.65 to 1.0.

Figure 2:
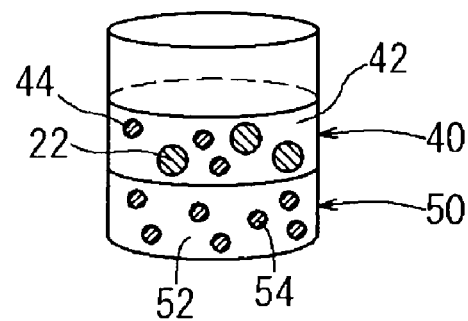
FIG. 2 is a schematic drawing for explaining the relationship between specific gravities of a compound material paste and a binder solution and separation of the two into two phases.

The following provides a more detailed explanation of an embodiment of the present invention. In the present embodiment, a liquid phase bilayer state composed of a binder solution layer and a compound material paste layer is formed by imparting a difference in SP values and a difference in specific gravity. In this electrode production method, the binder solution layer 50 is prepared in which the binder 54 is dispersed in a solvent 52 capable of separating into two phases with a solvent 42 of the compound material paste 40, and the specific gravity of the binder solution 50 is higher than that of the compound material paste 40. The relationship between the binder solution 50 and the compound material paste 40 is schematically shown in FIG. 2. The binder solution 50 is composed of a solvent (such as $CCl_4$) 52 capable of separating into two phases with a solvent (such as water) 42 of the compound material paste. For example, a solvent that spontaneously separates into two phases (namely, a phase-separable solvent) when allowed to stand undisturbed after stirring and mixing both solvents can be used preferably. In addition, the specific gravity of the binder solution 50 is higher than that of the compound material paste 40. Consequently, when both are mixed and allowed to stand undisturbed, the solvents separate into two phases such that the binder solution 50 becomes the lower layer.

Next, as shown in FIG. 3, a dot-like binder solution layer 56 is formed by applying the binder solution 50 to the surface of the current collector 10. This binder solution layer (binder layer) 56 is typically a liquid layer composed of the binder solution 50.

Next, as shown in FIG. 4, the compound material paste 40 is applied to the current collector 10 over the dot-like binder solution layer 56. At that time, since the dot-like binder solution layer 56 is composed of the solvent 52 capable of separating into two phases with the solvent 42 of the compound material layer, it does not readily mix with the compound material paste 40 (and preferably, the binder solution layer 56 and the compound material paste layer 46 (compound material paste 40) are separated into two phases). In addition, since the binder solution layer 56 has a higher specific gravity than the compound material paste layer 46 (compound material paste 40), when the compound material paste 40 is applied over the binder solution layer 56, the dot-like binder solution layer 56 and the compound material paste layer 46 (compound material paste 40) do not readily mix, and the binder solution layer 56 is easily confined to the vicinity of the surface of the current collector 10 (lower layer).

Subsequently, by drying both the deposited dot-like binder solution layer 56 and compound material paste layer 46, the electrode 30 is obtained in which the compound material layer 20 is formed on the current collector 10 as shown in FIG. 5.

According to this electrode production method, since the compound material paste layer 46 is dried in a state in which a dot-like binder solution layer 56 is formed between the current collector 10 and the compound material paste layer 46, the first binder 54 of the dot-like binder solution layer 56 is arranged at the interface between the compound material layer 20 and the current collector 10 obtained after drying. As a result, the adhesive strength between the compound material layer 20 and the current collector 10 can be enhanced. In addition, since drying is carried out in a state in which a portion of the compound material paste layer 46 is deposited on the current collector 10 within the binder solution non-coated region 58, a region exists where the binder 54 of the binder solution layer is not arranged at the interface between the current collector 10 and the compound material layer 20. An electrically conductive path can be secured between the current collector 10 and the compound material layer 20 through this region where binder is not arranged.

Although not intended to be particularly limiting, the following provides a detailed explanation of the present embodiment with reference to FIGS. 2 to 5 by primarily using as an example the case of producing a negative electrode for a lithium secondary battery (and typically, a lithium ion battery). In this embodiment, a liquid phase bilayer state composed of the binder solution layer and the compound material paste layer is formed by imparting a difference in SP values and a difference in specific gravity.

Namely, in this embodiment, a binder solution 50 is prepared in which the first binder 54 is dispersed in the solvent (binder solvent) 52 capable of separating into two phases with the solvent (paste solvent) 42 of the compound material paste 40 as shown in FIG. 2.

There are no particular limitations on the binder (first binder 54) used for the binder solution, and it may be the same as that used in a typical negative electrode for a lithium secondary battery. A water-soluble or water-dispersible polymer can be used such as styrene butadiene rubber (SBR), carboxymethyl cellulose (CMC), polytetrafluoroethylene (PTFE), polyethylene (PE) or polyacrylic acid (PAA). Alternatively, an organic solvent-based polymer such as polyvinylidene fluoride (PVDF) or polyvinylidene fluoride-hexafluoropropylene (PVDF-HFP) copolymer can be used. In this embodiment, SBR is used for the binder.

The solvent (binder solvent) used for the binder solution 50 preferably has a specific gravity higher than the solvent of the compound material paste and is capable of separating into two phases with the solvent of the compound material paste. For example, a solvent having a difference in solubility parameter with the solvent of the compound material paste of 2 or more (such as that having a difference in solubility parameter of about 2 to 25) can be preferably used for the binder solvent 52. In addition, the binder solvent 52 is preferably a solvent that is able to uniformly disperse or dissolve the binder used. More specifically, examples of binder solvents that can be preferably used in the case the dispersion solvent of the compound material paste is water include carbon tetrachloride ($CCl_4$), chloroform ($CHCl_3$), trichloroethane ($C_2H_3Cl_3$) and trichloroethylene ($C_2HCl_3$). In addition, a fluorine-based liquid may also be used that has a difference in SP value with water of 2 or more and has a higher specific gravity than water. One type or two or more types thereof can be suitably selected and used. Furthermore, a fluorine-based liquid as referred to here indicates a solvent (and typically, an organic solvent) containing fluorine (F) as a constituent element thereof. An example of a commercially available product of a fluorine-based liquid able to be used preferably in the technology disclosed herein is a member of the "Fluorinate®" series manufactured by the 3M Corp. In addition, $CCl_4$ is an example of a binder solvent that can be preferably used in the case the paste solvent is N-methylpyrrolidone (NMP). In addition, a fluorine-based liquid may be used that has a difference in SP value of 2 or more with N-methylpyrrolidone and has a specific gravity higher than that of N-methylpyrrolidone.

The binder solution can be prepared by dispersing the binder 54 in the solvent 52. As a result, the binder solution 50 is obtained in which the binder 54 is dispersed in the solvent 52. Furthermore, although FIGS. 2 to 4 depict a state in which the binder 54 is dispersed in the solvent 52 while maintaining a granular form, the present invention is not limited thereto, but rather the binder 54 may also be dissolved in the binder 52 without maintaining a granular form.

Although there are no particular limitations on the concentration (solid concentration) of the binder in the binder solution, if the binder concentration is excessively high, solution coatability becomes poor, while if the binder concentration is excessively low, the drying rate becomes slow which may cause a decrease in productivity. Thus, the binder concentration (solid concentration) is preferably roughly 5 to 50% by weight, and more preferably roughly 15 to 25% by weight.

Once the binder solution has been prepared in this manner, the dot-like binder solution layer 56 is then formed by applying (and typically, coating) the binder solution 50 to the current collector 10 as shown in FIG. 3. A current collector composed of a metal having favorable electrical conductivity (for example, a metal such as aluminum, nickel, copper or stainless steel, or alloy having such a metal as the main component thereof) can be preferably used for the current collector 10. For example, in the case of producing a negative electrode for a lithium secondary battery, a current collector made of copper (referring to that composed of copper or alloy composed mainly of copper (copper alloy)) is used preferably.

The procedure for coating (applying) the dot-like polymer solution onto the current collector can be carried out using a typical fluid material coating technology, examples of which include printing methods (such as inkjet printing, relief printing, gravure printing or screen printing) and spraying. In particular, forming the dot-like binder solution layer by spraying is preferable in terms of ease of production. In the technology disclosed herein, an example of a method used to apply the binder solution 50 to the current collector 10 consists of coating the binder solution in the form of dots on the surface of the current collector using a spraying method. As a result, the dot-like binder solution layer 56 can be formed easily.

Although there are no particular limitations on the coated amount of the binder solution (coated amount per unit surface area of the current collector), if the coated amount of the binder solution is excessively low, the amount of the binder contained in the solution becomes excessively low, and this may prevent the effect of enhancing adhesive strength between the current collector 10 and the compound material layer 20 from being adequately obtained. On the other hand, if the coated amount of the binder solution is excessively high, the amount of the binder contained in the solution becomes excessively high, and this may cause a decrease in battery performance due to an increase in interface resistance between the current collector 10 and the compound material layer 20. Thus, the coated amount of the binder solution as the solid content (namely, as the weight of the binder after drying) is preferably adjusted so as to be roughly about 0.01 to 0.05 mg/cm$^2$ and normally 0.02 to 0.03 mg/cm$^2$. Furthermore, the compound material layer 20 may also be provided on both sides of the current collector 10 instead of on just one side of the current collector 10. In the case of providing the compound material layer 20 on both sides of the current collector 10, an aspect can be preferably employed in which the dot-like binder solution layer 56 is formed by coating the binder solution 50 onto both sides of the current collector 10.

Once the dot-like binder solution layer 56 has been formed in this manner, the binder solution layer 56 and the compound material paste layer 46 are then deposited on the current collector 10 by applying (and typically, coating) the compound material paste 40 over the dot-like binder solution layer 56 as shown in FIG. 4. At this time, since the dot-like binder solution layer 56 has the binder solution non-coated region 58 in a region that superimposes the compound material paste layer 46, compound material paste is filled into the binder solution non-coated region 58, and a portion of the compound material paste layer 46 contacts the top of the current collector within the non-coated region 58.

The compound material paste 40 can be prepared by mixing the negative electrode active material (and typically, a powdered form thereof) 22 with another negative electrode compound material layer forming component (such as the binder 44) used as necessary in a suitable solvent 42.

There are no particular limitations on the negative electrode active material (and typically, a powdered form thereof) 22, and it may be the same as that used in a typical lithium ion secondary battery. Typical examples of the negative electrode active material 22 used for the negative electrode include carbon-based materials such as graphite carbon or amorphous carbon, lithium transition metal composite oxides (such as lithium titanium composite oxides), and lithium transition metal composite nitrides.

Preferable examples of the solvent 42 used for the compound material paste 40 include water and mixed solvents composed mainly of water (aqueous solvents). One type or two or more types of organic solvents able to uniformly mix with water (such as lower alcohols or lower ketones) can be suitably selected and used for the solvent other than water that composes this mixed solvent. The solvent 42 is not limited to an aqueous solvent, but rather may also be a non-aqueous solvent. An example of a non-aqueous solvent that can be used is N-methylpyrrolidone (NMP).

In addition to the negative electrode active material 22, the compound material paste 40 can contain as necessary a material used in compound material pastes for forming a negative electrode compound material layer in the production of an ordinary negative electrode. Typical examples of such materials include electrical conductive materials and the binder (second binder) 44. Examples of electrically conductive materials that can be used include carbon powder such as carbon black (including acetylene black) and electrically conductive metal powders such as nickel powder. The second binder 44 fulfills the role of binding negative electrode active material particles together. This second binder 44 may be the same material as the first binder 54 contained in the binder solution layer 56 or a different material.

The technology disclosed herein can be preferably carried out in an aspect in which the same binder is used for the compound material paste layer 46 and the binder solution layer 56. In the case the compound material paste layer 46 contains a plurality of types of binders, at least one type thereof is preferably the same binder as that of the binder solution layer 56.

The technology disclosed herein can also be preferably carried out in an aspect in which different binders are used for the compound material paste layer 46 and the binder solution layer 56. In this case, there is the advantage of being able to easily analyze and confirm the binder component originating in the binder solution. In this case, a binder can be preferably selected for the first binder 54 contained in the binder solution layer that is readily soluble in the solvent 52 of the binder solution and poorly soluble in the solvent 42 of the compound material paste. As a result, diffusion of the first binder 54 in the compound material paste layer is suitably inhibited, and an amount of binder can be suitably secured in the vicinity of the current collector.

The procedure for applying (and typically, coating) the compound material paste 40 to the current collector 10 can be carried out in the same manner as production of a negative electrode for an ordinary lithium secondary battery of the prior art with the exception of using a current collector in which the dot-like binder solution layer 56 is formed on the surface thereof as previously described for the current collector. For example, the compound material paste layer 46 can be formed by coating a prescribed amount of the compound material paste 40 onto the current collector 10 over the dot-like binder solution layer 56 using a suitable coating apparatus (such as a die coater).

Once the dot-like binder solution layer 56 and the compound material paste layer 46 have been deposited on the current collector 10 in this manner, the negative electrode 30 is then obtained in which the negative electrode compound material layer 20 is formed on the current collector 10 by drying both the deposited dot-like binder solution layer 56 and compound material paste layer 46 as shown in FIG. 5. At that time, since the binder solution layer 56 has the binder solution non-coated region 58 in the region that superimposes the compound material paste layer 46, the drying treatment is carried out in a state in which a portion of the compound material paste layer 46 is deposited on the current collector within the binder solution non-coated region 58.

The temperature at which both the dot-like binder solution layer 56 and the compound material paste layer 40 are dried is within a temperature range at which both the solvent 52 of the binder solution layer and the solvent 42 of the compound material paste layer can be volatilized. For example, in the case the solvent of the binder solution layer is $CCl_4$ and the solvent of the compound material paste is water, then the drying temperature can be made to be roughly about 70 to 160° C., and normally preferably 80 to 120° C.

Although it is necessary to bind the compound material layer 20 and the current collector 10 relying only on the second binder 44 contained in the compound material paste layer 46 in a conventional aspect in which the dot-like binder solution layer 56 is not formed, in this conventional aspect, since the second binder 44 rises up in the surface portion of the compound material paste layer 46 (opposite side of the current collector 10) if convection occurs during drying of the compound material paste layer 46 when drying is carried out rapidly, the amount of the binder in the vicinity of the current collector 10 becomes inadequate, thereby sometimes resulting in a decrease in adhesive strength (adhesion) between the current collector 10 and the compound material layer 20.

In contrast, in the present embodiment, since the compound material paste layer 46 is dried in a state in which the dot-like binder solution layer 56 is formed between the negative electrode current collector 10 and the compound material paste 40, even if convection occurs during rapid drying of the compound material paste layer 46, since the binder (first binder) 54 in the dot-like binder solution layer 56 that has separated from the compound material paste 40 is confined to the vicinity of the surface of the current collector 10, an amount of binder is secured in the vicinity of the current collector 10. As a result, decreases in adhesive strength between the compound material layer and the current collector 10 attributable to segregation (migration) of binder caused by convection during drying can be avoided, and a high-performance electrode 30 can be produced that is provided with the compound material layer 20 that demonstrates favorable adhesion to the current collector 10. The use of this method enables the compound material paste layer 46 to be dried rapidly since it is not necessary to consider binder segregation (migration) caused by convection when setting the drying rate of the compound material paste layer 46. For example, the solvent of the compound material paste layer can be volatilized at a high rate of 0.15 mg/s or more (namely, 0.15 mg/s·cm$^2$ or more) per 1 cm$^2$ of liquid surface area. Although there are no particular limitations on the upper limit of the drying rate, it is, for example, about 0.18 mg/s·cm$^2$.

In addition, since the binder solution layer 56 has the binder solution non-coated region 58 where the surface 12 of the current collector 10 is exposed, and drying is carried out in the state in which a portion of the compound material paste layer 46 is deposited on the current collector 10 within the binder solution non-coated region 58, a region exists where the binder 54 derived from the binder solution layer 56 is not arranged at the interface between the compound material layer 20 and the current collector 10 obtained after drying. An electrically conductive path is secured between the current collector 10 and the compound material layer 20 through this region where the binder is not arranged. Thus, according to the present embodiment, the electrode 30 can be produced that is provided with the compound material layer 20 that has favorable adhesion (adhesive strength) with the current collector 10 and has favorable electrical conductivity (small interface resistance between the compound material layer 20 and the current collector 10).

Production of the negative electrode 30 relating to the present embodiment is completed in this manner. Furthermore, the thickness and density of the negative electrode compound material layer 20 can be adjusted by carrying out suitable press processing (such as roll press processing) as necessary after drying the compound material paste 40.

The cross-sectional structure of the negative electrode 30 for a lithium secondary battery preferably produced by applying the electrode production method disclosed herein is schematically shown in FIG. 5. The negative electrode 30 has a configuration in which the negative electrode compound material layer 20 containing the negative electrode active material 22 is retained on the current collector 10. As shown in FIG. 4, this negative electrode compound material layer 20 is formed by forming the binder solution layer 56 between the current collector 10 and the compound material paste layer 46 followed by drying both the binder solution layer 56 and the compound material paste 40. Consequently, when the resulting negative electrode compound material layer 20 is divided into two equal parts at the central portion thereof in the direction of thickness, the amount of the binder contained in the divided portion 20A arranged on the current collector 10 side of the compound material layer 20 is greater than the amount of the binder contained in the divided portion 20B arranged on the opposite side from the current collector 10. Namely, the degree of binder segregation when the compound material layer 20 is divided into two equal parts at the central portion thereof in the vertical direction (direction of thickness) (namely, the amount of the binder of the upper layer 20B/amount of the binder of the lower layer 20A) is less than 1.0 (namely, a state in which the amount of the binder of the lower layer 20A is greater than the amount of the binder of the upper layer 20B). As a result, a larger amount of binder is arranged on the surface of the current collector 10, and adhesive strength between the negative electrode compound material layer 20 and the current collector 10 can be enhanced. Furthermore, the distribution of binder in the compound material layer can be investigated in the case the binder is SBR, for example, by observing a Br distribution cross-section of the binder dyed with Br using an electron probe microanalyzer (EPMA).

Furthermore, in the present embodiment, the binder solution layer 56 is formed so as to be sporadically present in the form of dots within the range over which the compound material paste layer 46 is applied as shown in FIG. 4. This formation of the binder solution layer 56 is carried out by, for example, spraying the binder solution 50 onto the surface of the current collector 10. The use of spraying enables the binder solution layer 56 to be formed in the form of points (dots) on the surface of the current collector.

In the case of forming the binder solution layer 56 in the form of dots in this manner, since the contact surface area between the current collector 10 and the compound material layer 20 increases (amount of binder in the vicinity of the current collector decreases) in comparison with the case of continuously forming (in the form of a band) the binder solution layer 56 over the entire range (entire region) where the compound material paste layer 46 is applied, interface resistance between the current collector 10 and the compound material layer 20 can be reduced. On the other hand, in the case of forming the binder solution layer 56 over the entire surface, since the amount of binder on the surface of the current collector 10 increases in comparison with the case of forming in the form of dots, adhesive strength between the current collector 10 and the compound material layer 20 can be increased. In a preferable technology disclosed herein, roughly 40% or more (and preferably about 60 to 80%) of the region (range) of the surface of the current collector 10 where the compound material paste 40 is applied is preferably covered by the dot-like binder solution layer 56. As a result of covering over this range, adhesive strength between the compound material layer and the current collector is enhanced while inhibiting increases in interface resistance between the compound material layer and the current collector, thereby making it possible to realize both interface resistance and adhesive strength at a high level.

Figure 8:
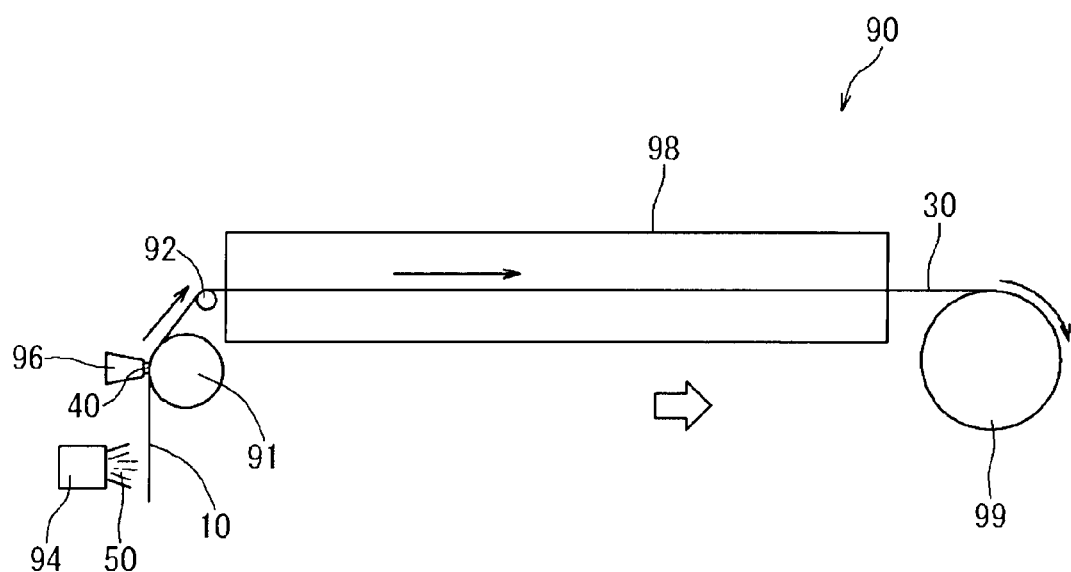
FIG. 8 is a cross-sectional view schematically showing a production apparatus of a negative electrode relating to an embodiment of the present invention.

Next, an explanation is provided of a production apparatus 90 for producing the negative electrode 30 while additionally referring to FIG. 8. This production apparatus 90 is provided with rollers 91 and 92, a spraying apparatus 94, a die coater 96 arranged downstream from the spray apparatus 94 in the direction of current collector transport, a drying oven 98 arranged downstream from the die coater 96 in the direction of current collector transport, and a take-up unit 99 that takes up the current collector 10 that has passed through the drying oven 98.

The long sheet-like current collector 10 is unwound from an unwinding unit not shown, and transported through the apparatus by rotation of the rollers 91 and 92. The binder solution 50 is housed in the spraying apparatus 94. By the spraying apparatus 94, the binder solution 50 is sprayed onto the surface of the current collector 10 during transport to form the dot-like binder solution layer. The current collector 10 on which the dot-like binder solution layer has been formed on the surface thereof is sent to the die coater 96 by the rollers 91 and 92. The compound material paste 40 is housed in the die coater 96. By the die coater 96, the compound material paste 40 is coated over the dot-like binder solution layer onto the surface of the current collector 10 during transport, and the dot-like binder solution layer and the compound material paste layer are deposited on the current collector 10. The current collector 10 on which has been deposited the dot-like binder solution layer and the compound material paste layer is then sent to the drying oven 98. The temperature in the drying oven 98 is set to, for example, about 80 to 120° C., and the transport speed of the current collector 10 is set to, for example, about 30 to 50 m/min. As a result of passing the current collector 10 through the drying oven 98 under these conditions, the binder solution layer and the compound material paste layer deposited on the current collector 10 are dried, and the negative electrode sheet 30 is obtained in which the compound material layer 20 is formed on the current collector 10. The negative electrode sheet 30 is then taken up by the take-up unit 99 and supplied to the next step.

Next, the following experiments were carried out as examples in order to confirm that the adhesive strength between the current collector and the compound material layer is enhanced by using the method of the present embodiment.

Test Example 1

In Sample 1, the negative electrode sheet 30 was produced by preparing a binder solution and compound material paste having different SP values and specific gravities. More specifically, the binder solution 50 (solid content: 10% by weight) was prepared by dispersing styrene butadiene rubber (SBR) as the first binder 54 in a solvent composed of carbon tetrachloride ($CCl_4$, SP value: 8.6, specific gravity: 1.58). In addition, the compound material paste 40 was prepared by using carbon powder for the negative electrode active material 22, using carboxymethyl cellulose (CMC) as a thickener, and dispersing these in water (SP value: 23.4, specific gravity: 1.00) so that the weight ratio of these materials was 99:1.

Next, a copper foil 10 on which was provided the binder solution layer 56 in the form of separate dots (in the form of mutually independent dots) was produced by coating the binder solution 50 onto a long sheet-like copper foil (current collector) 10 in the form of dots by spraying. The coated amount of the binder solution 50 was adjusted to be roughly 0.025 mg/cm$^2$ (as solid content). The dot-like binder solution layer 56 and the compound material paste layer 46 were then deposited on the copper foil (current collector) 10 by applying the compound material paste 40 over the dot-like binder solution layer 56, and the negative electrode sheet 30, in which the negative electrode compound material layer 20 was provided on the surface of the current collector 10, was obtained by drying both at 80° C.

In addition, for the sake of comparison, a negative electrode sheet was produced without coating the binder solution 50 onto the current collector 10 in Sample 2. The compound material paste was prepared by using carbon powder for the negative electrode active material, using SBR for the binder, using CMC as a thickener, and dispersing these materials in water at a weight ratio of 99:1:1, and this was then coated onto the current collector (copper foil) in the form of strips and dried to obtain a negative electrode sheet in which the negative electrode compound material layer was provided on the surface of the current collector.

Adhesion between the current collector 10 and the negative electrode compound material layer 20 of the negative electrode sheets relating to Samples 1 and 2 obtained in this manner was evaluated with a 90° peel test using a tensile tester. The results are shown in Table 1. As shown in Table 1, in Sample 1 in which the binder solution was coated onto copper foil (current collector), peel strength improved considerably as compared with Sample 2 in which the binder solution was not coated onto copper foil (current collector). More specifically, the peel strength for Sample 1 was 2.8 N/m, while the peel strength for Sample 2 was 0.8 N/m. On the basis of these results, coating the binder solution onto the copper foil (current collector) was confirmed to considerably improve adhesive strength.

TABLE 1

|  | Solvent of compound material paste | Solvent of binder solution | Peel strength (N/m) |
| --- | --- | --- | --- |
| Sample 1 | Water | $CCl_4$ | 2.8 |
| Sample 2 | Water | None | 0.8 |

Test Example 1

In Samples 3 to 5, the negative electrode sheet 30 was produced by preparing a binder solution and compound material paste having different viscosities. More specifically, in Sample 3, the binder solution (solid content: 10%) having a viscosity of 80 mPa·s was prepared by dispersing SBR as the first binder 54 in water. In addition, the compound material paste having a viscosity of 4000 mPa·s was prepared by using carbon powder as the negative electrode active material 22 and carboxymethyl cellulose (CMC) as a thickener, and dispersing these in water so that the weight ratio of these materials was 99:1. The viscosities of the binder solution and the compound material paste were measured using a B type viscometer and by rotating the rotor at 1 rpm after adjusting the liquid temperature to 25° C.

Next, a copper foil 10 on which was provided the binder solution layer 56 in the form of separate dots (in the form of mutually independent dots) was produced by coating the binder solution 50 onto a long sheet-like copper foil (current collector) 10 in the form of dots by spraying. The coated amount of the binder solution 50 was adjusted to be roughly 0.012 mg/cm$^2$ (as solid content). The separate dot-like binder solution layer 56 and the compound material paste layer 46 were then deposited on the copper foil (current collector) 10 by applying the compound material paste 40 over the separate dot-like binder solution layer 56, and the negative electrode sheet 30, in which the negative electrode compound material layer 20 was provided on the surface of the current collector 10, was obtained by drying both at 80° C.

In sample 4, the negative electrode sheet 30 was produced in the same manner as sample 3 with the exception of changing the coated form of the binder solution layer 56 to the form of mutually connected dots (continuous dot form). More specifically, prior to applying the binder solution to the copper foil (current collector), the surface of the copper foil (current collector) was irradiated with plasma. Irradiation of the surface of the copper foil with plasma was carried out using an ordinary plasma surface treatment apparatus. Plasma treatment conditions consisted of a discharge quantity of 8 W·min/m$^2$. When the binder solution was adhered to the surface of the copper foil following plasma radiation, the contact angle of the binder solution was about 60°. The copper foil 10 was obtained that was provided with a connected dot-like binder solution layer 56 by coating the binder solution onto the surface of the copper foil by spraying. Subsequently, the negative electrode sheet 30 was produced in which the compound material layer 20 was provided on the surface of the copper foil under the same conditions as sample 3.

Moreover, in sample 5, the negative electrode sheet 30 was produced in the same manner as sample 3 with the exception of changing the coated form of the binder solution layer 56 to the form of a band covering the entire surface for the sake of comparison. More specifically, the binder solution was coated in the form of a band over the entire surface of the region where the compound material layer is formed on the surface of the copper foil to obtain the copper foil 10 in which the binder solution layer is present over the entire surface in the form of a band and is free of a region where the binder solution is not coated. The coated amount of the binder solution 50 was adjusted to roughly 0.0245 mg/cm² (as solid content). Subsequently, the negative electrode sheet 30 was produced in which the compound material layer 20 was provided on the surface of the current collector 10 under the same conditions as sample 3.

Moreover, in sample 6, a negative electrode sheet (to be referred to as an ordinary electrode) was produced in which the binder solution 50 was not coated onto the current collector 10 for the sake of comparison. More specifically, carbon powder used as a negative electrode active material, SBR used as binder and CMC used as thickener were dispersed in water so that the weight ratio of these materials was 98.6:0.7:0.7 to prepare a compound material paste, followed by obtaining a negative electrode sheet in which a negative electrode compound material layer was provided on the surface of a current collector by coating the compound material paste onto the current collector (copper foil) and drying.

Figure 9:
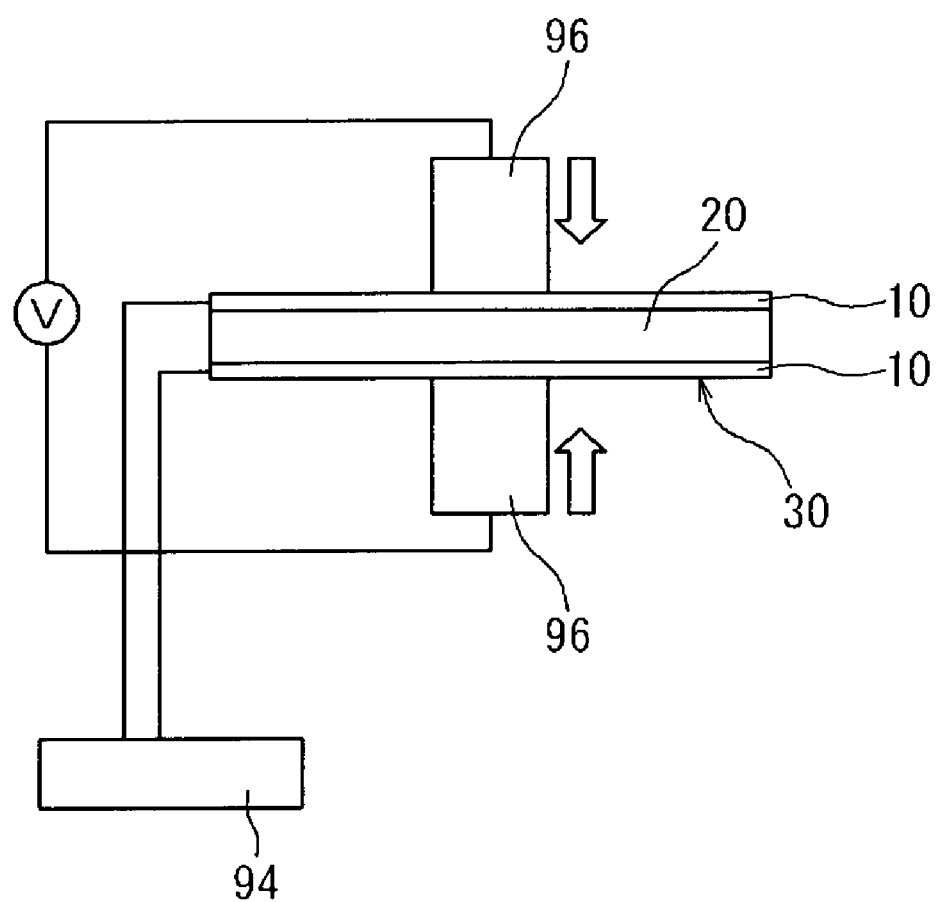
FIG. 9 is a drawing schematically showing a resistance measuring apparatus of a negative electrode sheet relating to a test example of the present invention.
Figure 10:
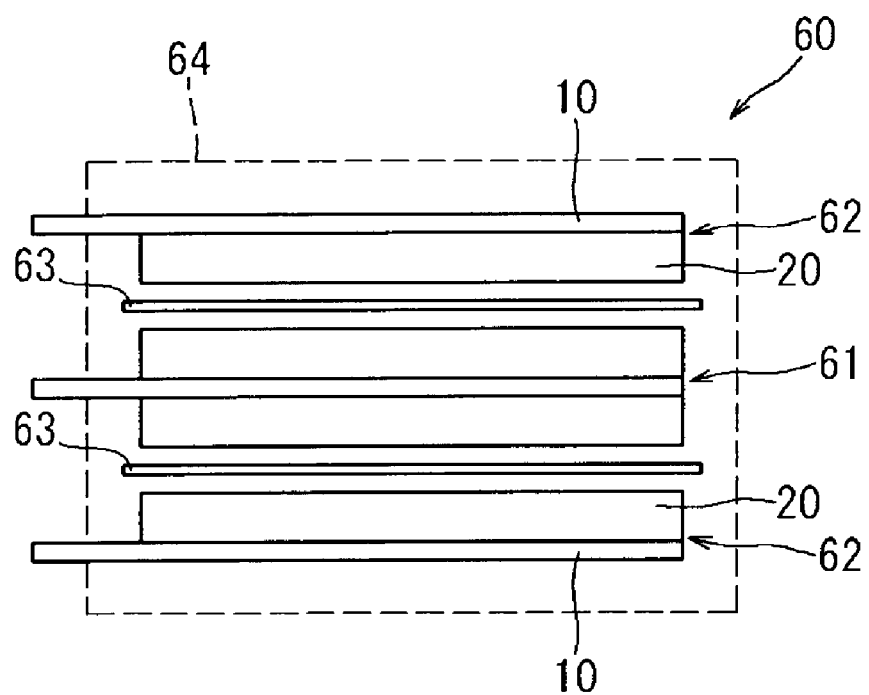
FIG. 10 is a drawing schematically showing laminated cells relating to a test example of the present invention.

Adhesion between the current collector 10 and the negative electrode compound material layer 20 of the negative electrode sheet 30 in samples 3 to 6 obtained in this manner was evaluated with a 90° peeling test using a tensile tester. In addition, contact resistance of the negative electrode sheet 30 of samples 3 to 5 was measured using the apparatus shown in FIG. 9. As shown in FIG. 9, another negative electrode current collector (copper foil) 10 was superimposed over the negative electrode compound material layer 20 of the negative electrode sheet 30. The negative electrode sheet 30 was placed between a pair of voltage measuring terminals 96, and the contact resistance (Ω·cm) of the negative electrode sheet 30 was measured based on a change in voltage when a current was applied from a current application apparatus 94 while applying a load of 1 MPa/cm² from above and below the voltage measuring terminals 96. Those results are shown in Table 2.

TABLE 2

|  | Form of binder solution layer | Peel strength (N/m) | Contact resistance (Ω · cm²) |
|---|---|---|---|
| Sample 3 | Separate dots | 1.08 | 0.42 |
| Sample 4 | Connected dots | 1.70 | 0.58 |
| Sample 5 | Band covering entire surface | 2.33 | 0.72 |
| Sample 6 (ordinary electrode) | — | 1.16 | 0.47 |

As is clear from Table 2, in sample 6 (ordinary electrode), in which a negative electrode sheet was produced without coating a binder solution layer onto the current collector, peel strength decreased due to a lack of binder in the vicinity of the current collector caused by segregation of the binder during drying. In contrast, in any of samples 3 to 5, in which negative electrodes were produced by coating a binder solution layer onto a current collector, peel strength increased considerably as compared with sample 6 (ordinary electrode). On the basis of a comparison between samples 3 and 4 in particular, even higher peel strength was confirmed to be obtained by forming the binder solution layer in the form of connecting dots. In addition, when the contact resistance values of samples 3 to 5 were compared, samples 3 and 4, in which the binder solution layer was formed in the form of dots, were found to demonstrate well-defined decreases in contact resistance values as compared with sample 5, in which the binder solution layer was formed in the form of a band covering the entire surface. On the basis of these findings, forming of the binder solution layer in the form of dots was able to be confirmed to lower interface resistance between the current collector and the compound material layer.

Test Example 3

In samples 7 to 12, the negative electrode sheets 30 were produced in the same manner as sample 4 with the exception of adjusting the coverage rate of the surface of the current collector by the dot-like binder solution layer as shown in the following Table 3. Here, the coverage rate of the binder solution layer (%) is expressed as [surface area of surface of current collector covered by binder solution layer/surface area of region where compound material layer is formed on surface of current collector]×100, and a coverage rate of 50% (sample 9), for example, means that 50% of the region where the compound material layer is formed on the surface of the current collector is covered by the binder solution layer. Furthermore, in this example, the coated amount of the binder solution when the coverage rate is 100% was roughly 0.0245 mg/cm² (as solid content), and the coated amount of the binder solution when the coverage rate is 50% was half that amount (roughly 0.01225 mg/cm²).

In addition, a negative electrode sheet (ordinary electrode) was produced in sample 13 under the same conditions as sample 6 for the sake of comparison.

TABLE 3

|  | Coverage rate (%) | Peel strength (N/m) | Low-temperature reaction resistance (mΩ) |
|---|---|---|---|
| Sample 7 | 20 | 1.05 | 300 |
| Sample 8 | 40 | 1.42 | 320 |
| Sample 9 | 50 | 1.6 | 332 |
| Sample 10 | 60 | 1.96 | 343 |
| Sample 11 | 80 | 2.11 | 362 |
| Sample 12 | 100 | 2.33 | 384 |
| Sample 13 (ordinary electrode) | — | 1.16 | 432 |

Figure 11:
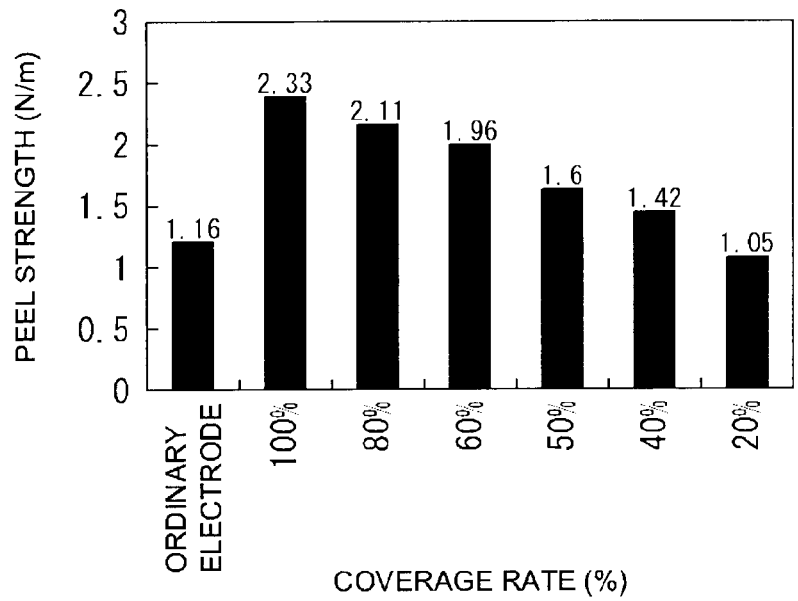
FIG. 11 is a graph indicating the relationship between coverage rate and peel strength of a binder solution layer.

Adhesion between the current collector 10 and the negative electrode compound material layer 20 of the negative electrode sheets relating to samples 7 to 13 obtained in this manner was evaluated with a 90° peeling test using a tensile tester. Those results are shown in Table 3 and FIG. 11. FIG. 11 is a graph indicating the relationship between coverage rate and peel strength of the binder solution layer, coverage rate (%) is plotted on the horizontal axis, and peel strength (N/m) is plotted on the vertical axis.

As is clear from FIG. 11 and Table 3, peel strength was confirmed to increase and adhesion (adhesive strength) of the compound material layer was confirmed to be favorable as the coverage rate of the binder solution layer increased. When the coverage rate was 40% or more (samples 8 to 12) in particular, peel strength increased considerably in comparison with the ordinary electrode (sample 13). Moreover, extremely high peel strengths of 1.6 N/m or more (and typically, 1.6 to 2.33 N/m) were able to be realized by making the coverage rate 60% or more. On the basis of these results, it was determined that a coverage rate of the binder solution layer of 40% or more (and preferably, 60% or more) is preferable for obtaining favorable adhesion of the compound material layer.

In addition, test lithium secondary batteries were constructed using the negative electrode sheets relating to samples 7 to 13, and alternating current impedance was measured for each of these test batteries to evaluate low-temperature reaction resistance (mΩ) of these batteries. Furthermore, the test lithium batteries were constructed in the manner described below.

LiNi$_{1/3}$Mn$_{1/3}$Co$_{1/3}$O$_2$ powder serving as positive electrode active material, acetylene black (AB) serving as an electrically conductive material and polyvinylidene fluoride (PVDF) serving as binder were mixed in N-methylpyrrolidone (NMP) so that the weight ratio of these materials was 90:8:2 to prepare a positive electrode compound material paste. This positive electrode compound material paste was then coated in the form of strips on both sides of a positive electrode current collector (aluminum foil) followed by drying to produce a positive electrode sheet in which the positive electrode compound material layer was provided on both sides of the positive electrode current collector. The coated amount of the positive electrode compound material paste was adjusted to about 4.8 mg/cm$^2$ (as solid content) per side.

The resulting positive electrode compound material layer of the positive electrode sheet was stamped out to a size measuring 3 cm×4 cm to produce a positive electrode. In addition, the negative electrode compound material layer of the above-mentioned negative electrode sheet was stamped out to a size of 3 cm×4 cm to produce a negative electrode. An aluminum lead was attached to the positive electrode, a nickel lead was attached to the negative electrode, the two electrodes were arranged in mutual opposition with a separator (using porous polypropylene) interposed there between, and the electrodes were inserted into a laminated pouch together with a non-aqueous electrolyte to construct a laminated cell 60 shown in FIG. 11. In FIG. 11, reference symbol 61 indicates the positive electrode, reference symbol 62 indicates the negative electrode, reference symbol 63 indicates the separator impregnated with electrolyte, and reference symbol 64 indicates the laminated pouch. Furthermore, a mixed solvent containing ethylene carbonate (EC), dimethyl carbonate (DMC) and ethylmethyl carbonate (EMC) at a volume ratio of 3:4:3, which also contained LiPF$_6$ as a supporting salt at a concentration of about 1 mol/liter, was used for the non-aqueous electrolyte. Subsequently, a test lithium secondary battery was obtained by carrying out initial charge-discharge treatment (conditioning) in accordance with ordinary methods.

Figure 12:
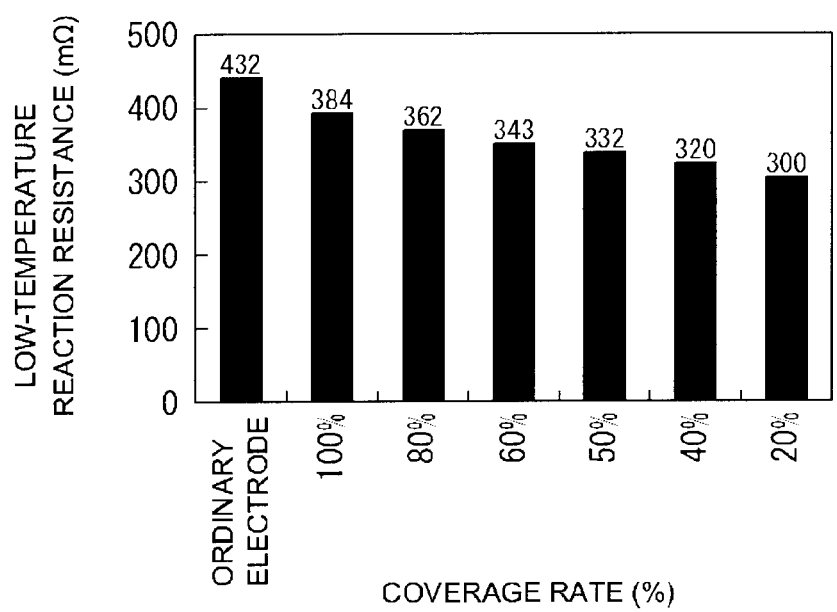
FIG. 12 is a graph indicating the relationship between coverage rate and low-temperature reaction resistance of a binder solution layer.

The alternating current impedance of the lithium secondary batteries produced in this manner was measured at a testing temperature of 0° C. to evaluate their reaction resistance (mΩ). Alternating current impedance measurement conditions consisted of an applied alternating current voltage of 5 mV and a frequency range of 0.01 to 100000 Hz. Those results are shown in Table 3 and the graph of FIG. 12. FIG. 12 is a graph indicating the relationship between coverage rate and reaction resistance values, coverage rate (%) is plotted on the horizontal axis, and reaction resistance values (mΩ) are plotted on the vertical axis.

As is clear from FIG. 12 and Table 3, in the battery of sample 13 (ordinary electrode), in which a negative electrode sheet was produced without coating a binder solution layer on the current collector, the reaction resistance value exceeded 430 mΩ as a result of the surface side of the compound material layer becoming binder-rich due to segregation of the binder during drying. In contrast, in the batteries of samples 7 to 12 in which a binder solution layer was coated onto the current collector, reaction resistance values decreased considerably in comparison with sample 13 (ordinary electrode).

In addition, reaction resistance values were confirmed to decrease as the coverage rate of the binder solution layer became smaller. In the case of the test batteries used here, reaction resistance values decreased considerably in comparison with the ordinary electrode (sample 13) when the coverage rate was made to be 80% or less (samples 7 to 11) in particular. Moreover, extremely low reaction resistance values of 343 mΩ or less (and typically, 300 to 343 mΩ) (samples 7 to 10) were able to be realized by making the coverage rate 60% or less. On the basis of these results, it was determined that a coverage rate of the binder solution layer of 80% or less (and preferably 60% or less) is preferable for lowering reaction resistance values.

Figure 13:
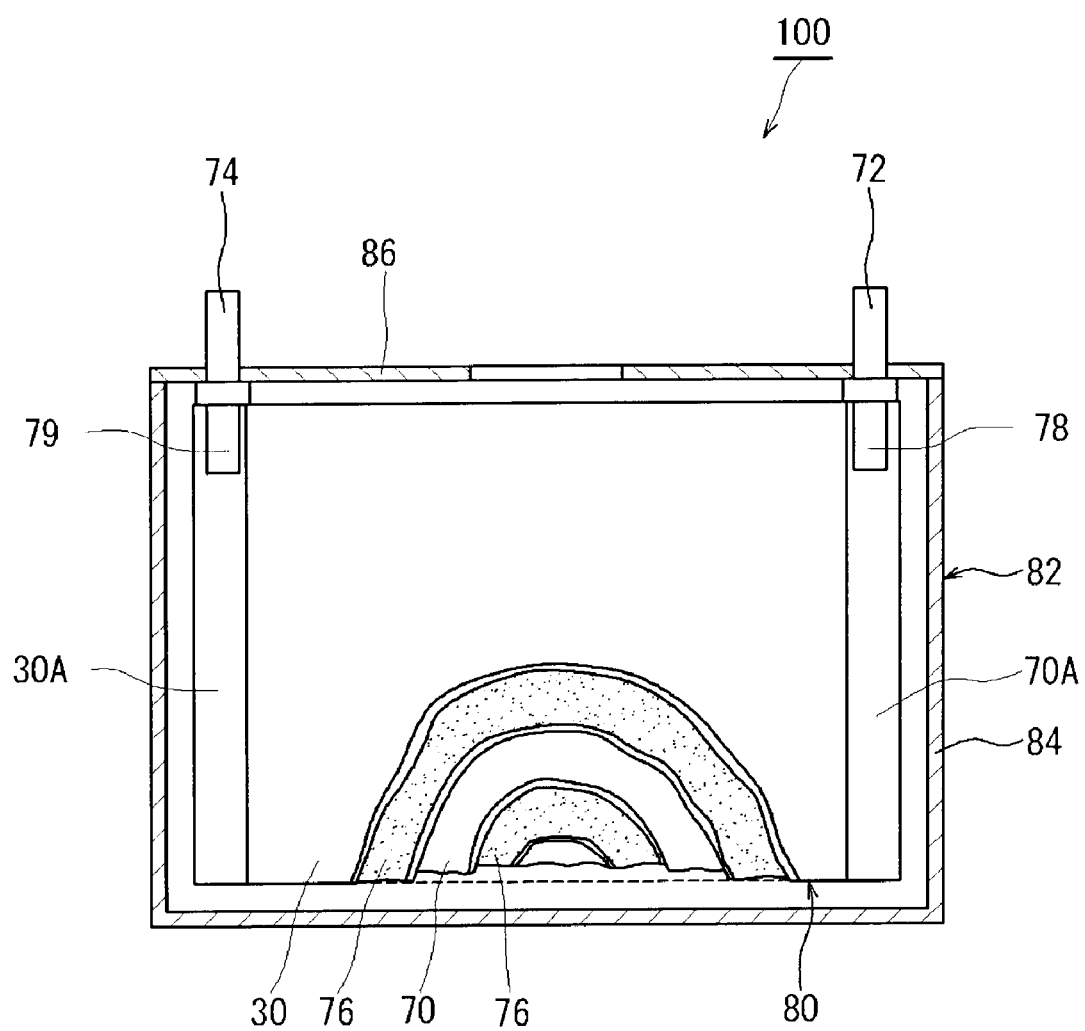
FIG. 13 is a drawing schematically showing a battery relating to an embodiment of the present invention.

The following provides an explanation of an embodiment of a lithium secondary battery constructed using the negative electrode (negative electrode sheet) 30 produced by applying the method described above with reference to the schematic drawing shown in FIG. 13. This lithium secondary battery 100 uses the negative electrode (negative electrode sheet) 30 produced by applying the above-mentioned method using the binder solution 50 for the negative electrode (negative electrode sheet) 30.

As shown in the drawing, the lithium secondary battery 100 relating to the present embodiment is provided with a case 82 made of metal (and preferably also made of a resin or laminated film). This case (outer container) 82 is provided with a case body 84 in the form of a flat rectangular solid having an open upper end, and a cover 86 that covers the opening. A positive electrode terminal 72, which is electrically connected to a positive electrode 70 of an electrode body 80, and a negative electrode terminal 74, which is electrically connected to the negative electrode 30 of the electrode body, are provided in the top of the case 82 (namely, in the cover 86). For example, the long sheet-like positive electrode (positive electrode sheet) 70 and the long sheet-like negative electrode (negative electrode sheet) 30 are laminated and wound together with a total of two long sheet-like separators (separator sheet) 76, after which the flat, wound electrode body 80, produced by collapsing the resulting wound body by pushing from the lateral direction, is housed within the case 82.

As previously described, the negative electrode sheet 30 has a configuration in which the negative electrode compound material layer 20 consisting mainly of the negative electrode active material is provided on both sides of the long sheet-like negative electrode current collector 10 (see FIG. 1). In addition, the positive electrode sheet 70 has a configuration in which the positive electrode compound material layer composed mainly of the positive electrode active material is provided on both sides of the long sheet-like positive electrode current collector in the same manner as the negative electrode sheet. Furthermore, the electrode production method disclosed herein can be applied to the production of either the positive electrode or negative electrode. The positive electrode sheet 70 may also be a positive electrode sheet 70 produced by applying the above-mentioned method using the binder solution 50 in the same manner as the negative electrode sheet 30. A portion at which an electrode compound material layer is not formed, where the above-mentioned electrode compound material layer is not provided, is formed on either side of one end in the direction of width of the electrode sheets 30 and 70.

During the lamination described above, the positive electrode sheet 70 and the negative electrode sheet 30 are superimposed while shifting in the direction of width so that the portion of the positive electrode sheet 70 where the positive electrode compound material layer is not formed and the portion of the negative electrode sheet 30 where the negative electrode compound material layer is not formed respectively protrude from both sides of the separator sheets 76 in the direction of width. As a result, the portions of the positive electrode sheet 70 and the negative electrode sheet 30 where the electrode compound material layers are not formed respectively protrude to the outside from a winding core portion (namely, the portion where the portions of the positive electrode sheet 70, the negative electrode sheet 30 where the electrode compound material layers, and the two separator sheets 76 are not formed are tightly wound) in the horizontal direction relative to the direction of winding of the wound electrode body 80. A positive electrode lead terminal 78 and a negative electrode lead terminal 79 are respectively provided on the positive electrode side protruding portion (namely, the portion where the positive electrode compound material layer is not formed) 70A and the negative electrode side protruding portion (namely, the portion where the negative electrode compound material layer is not formed) 30A, and are electrically connected to the above-mentioned positive electrode terminal 72 and the negative electrode terminal 74, respectively.

Furthermore, constituent elements that compose the wound electrode body 80 other than the negative electrode sheet 30 may be same as those of an electrode body of a conventional lithium secondary battery and there are no particular limitations thereon. For example, the positive electrode sheet 70 can be formed by applying a positive electrode compound material layer consisting mainly of a lithium secondary battery positive electrode active material onto a long positive electrode current collector. Aluminum foil or other metal foil suitable for a positive electrode is preferably used for the positive electrode current collector. One type or two or more types of materials conventionally used in lithium secondary batteries can be used without any particular limitations for the positive electrode active material. Preferable examples include those composed mainly of a lithium transition metal composite oxide containing as constituent metal elements lithium and one type or two or more types of transition metal elements, such as $LiMn_2O_4$, $LiCoO_2$ or $LiNiO_2$.

In addition, a preferable example of the separator sheets 76 used between the positive and negative electrode sheets 70 and 30 is that composed of a porous polyolefin-based resin. Furthermore, the separator may not be required in the case of using a solid electrolyte or gelled electrolyte for the electrolyte (namely, the electrolyte per se can function as a separator in such cases).

The wound electrode body 80 is housed in the case body 84 through the opening in the upper end of the case body 84, and an electrolyte solution containing a suitable electrolyte is arranged (filled) in the case body 84. The electrolyte is, for example, a lithium salt such as $LiPF_6$. For example, a non-aqueous electrolyte solution can be used that is obtained by dissolving a suitable amount (such as a concentration of 1 M) of a lithium salt such as $LiPF_6$ in a mixed solvent (having a weight ratio of, for example, 1:1) of diethyl carbonate and ethylene carbonate.

Subsequently, the opening is sealed by welding to the cover 86, for example, to complete assembly of the lithium secondary battery 100 relating to the present embodiment. The sealing process of the case 82 and the arrangement (filling) process of the electrolyte may be the same as techniques carried out in the production of conventional lithium secondary batteries, and are not intended to characterize the present invention. Construction of the lithium secondary battery 100 relating to the present embodiment is completed in this manner.

Since the lithium secondary battery 100 constructed in the manner described above is constructed using an electrode produced by applying the method using the binder solution 50 as previously described for at least one of the electrodes, it demonstrates superior battery performance. For example, by constructing a battery using the above-mentioned electrode, the lithium secondary battery 100 can be provided that satisfies at least one (and preferably both) of high cycle durability and superior productivity.

Furthermore, the technology disclosed herein includes that described below.

(1) A method for producing a battery electrode having a configuration in which a compound material layer containing an active material is retained on a current collector, wherein the compound material layer is formed by applying a compound material paste, in which the active material is dispersed in a prescribed solvent, to the current collector followed by drying, and formation of the compound material layer is carried out by a method including the following steps:

a step of preparing a binder solution, in which a binder is dispersed in a solvent capable of separating into two phases with the solvent of the compound material paste, and which has a higher specific gravity than the compound material paste, a step of forming a binder layer (or in other words, a binder solution layer) by applying the binder solution to the surface of the current collector, a step of depositing the binder layer and the compound material paste (namely, the compound material paste layer) on the surface of the current collector by applying the compound material paste to the current collector on which the binder layer has been formed over the binder layer; and a step of obtaining an electrode in which the compound material layer is formed on the current collector by drying both the deposited binder layer and compound material paste.

(2) In the technology disclosed herein, the solvent of the compound material paste contains water, and the solvent of the binder solution contains carbon tetrachloride or a fluorine-based liquid.

(3) In the technology disclosed herein, the solvent of the compound material paste contains N-methylpyrrolidone, and the solvent of the binder solution contains carbon tetrachloride or a fluorine-based liquid.

(4) In the technology disclosed herein, the binder layer is formed by spraying the binder solution.

(5) According to the present invention, a battery is also provided that is constructed using an electrode obtained according to any one of the above-mentioned methods disclosed herein. Namely, the battery is provided with an electrode produced according to any one of the methods described in (1) to (4) above, wherein the electrode has a configuration in which a compound material layer containing an active material is retained on a current collector, and when the compound material layer is divided into two parts in the direction of thickness, the amount of the binder contained in the divided part arranged on the current collector side of the compound material layer is greater than the amount of the binder contained in the divided portion arranged on the opposite side from the current collector.

INDUSTRIAL APPLICABILITY

According to the present invention, a method for producing a battery electrode is provided that enables adhesive strength between a current collector and a compound material layer to be enhanced.

Figure 14:
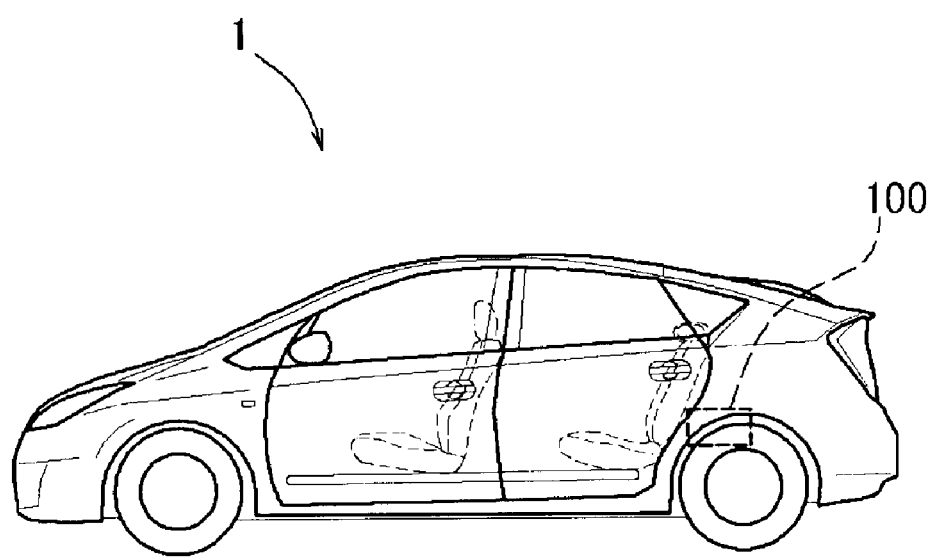
FIG. 14 is a side view of a vehicle equipped with a battery relating to an embodiment of the present invention.

Since the battery (such as a lithium secondary battery) relating to the present invention has superior battery performance as previously described, it can be used particularly preferably as a power supply for a motor installed in a vehicle such as an automobile. Thus, as schematically shown in FIG. 14, the present invention provides a vehicle (typically an automobile, and particularly an automobile equipped with a motor in the manner of a hybrid vehicle, electric vehicle or fuel cell vehicle) 1 that is equipped with this battery (which can also be in the form of a battery assembly) 100 as the power supply thereof.

The invention claimed is:

1. A method for producing a battery electrode having a configuration in which a compound material layer containing an active material and a binder is retained on a current collector,
   wherein the compound material layer is formed by applying a compound material paste containing the active material to the current collector followed by drying, and
   formation of the compound material layer is carried out by a method including the following steps:
   a step of forming a binder solution layer by applying a binder solution containing the binder to the current collector;
   a step of depositing the binder solution layer and a compound material paste layer on the current collector by applying the compound material paste over the binder solution layer; and
   a step of obtaining an electrode in which the compound material layer is formed on the current collector by drying both the deposited binder solution layer and compound material paste layer, and
   wherein the binder solution layer has a region where the binder solution is not coated and a surface of the current collector is exposed, and the drying is carried out in a state in which a portion of the compound material paste layer is deposited on the current collector in the region where the binder solution is not coated.

2. The production method according to claim 1, wherein the binder solution layer is formed in the form of mutually independent or connected dots.

3. The production method according to claim 2, wherein the dot-like binder solution layer is formed by spraying.

4. The production method according to claim 3, wherein the spraying is carried out after carrying out hydrophilic treatment on the surface of the current collector.

5. The production method according to claim 1, wherein a coverage rate of the binder solution layer in a region, on the surface of the current collector, where the compound material layer is formed is 40 to 80%.

6. The production method according to claim 1, wherein a solvent of the compound material paste is volatilized at a rate of 0.15 mg/s·cm$^2$ or more.

7. A battery constructed using an electrode produced according to the method described in claim 1.

8. The battery according to claim 7, wherein the electrode has a configuration in which a compound material layer containing an active material is retained on a current collector, and
   when the compound material layer is divided into two equal parts at a central portion thereof in a direction of thickness, an amount of the binder contained in a divided portion arranged on a current collector side of the compound material layer is larger than an amount of the binder contained in a divided portion arranged on an opposite side from the current collector.

9. A vehicle equipped with the battery according to claim 7.

* * * * *